United States Patent
Mumm et al.

(10) Patent No.: US 7,346,257 B2
(45) Date of Patent: Mar. 18, 2008

(54) BUFFER TUBES WITH IMPROVED FLEXIBILITY

(75) Inventors: Jeffrey H. Mumm, Marietta, GA (US); Christopher W. McNutt, Woodstock, GA (US); Jeffrey Scott Laws, Brownwood, TX (US)

(73) Assignee: Superior Essex Communications, LP, Atlanta, GA (US)

( * ) Notice: Subject to any disclaimer, the term of this patent is extended or adjusted under 35 U.S.C. 154(b) by 0 days.

(21) Appl. No.: 11/639,645

(22) Filed: Dec. 15, 2006

(65) Prior Publication Data

US 2007/0098336 A1    May 3, 2007

Related U.S. Application Data

(62) Division of application No. 10/856,639, filed on May 28, 2004.

(51) Int. Cl.
*G02B 6/44* (2006.01)
(52) U.S. Cl. ............... 385/141; 385/100; 385/109; 385/113; 385/128
(58) Field of Classification Search ............... None
See application file for complete search history.

(56) References Cited

U.S. PATENT DOCUMENTS

| 5,574,816 | A | 11/1996 | Yang et al. ............... 385/109 |
| 6,584,251 | B1 | 6/2003 | Ardouin ............... 385/109 |
| 6,882,784 | B2 | 4/2005 | Mumm et al. ............... 385/100 |
| 2002/0024424 | A1* | 2/2002 | Burns et al. ............ 340/310.01 |
| 2003/0141097 | A1* | 7/2003 | Belli et al. ............... 174/110 R |
| 2003/0202758 | A1 | 10/2003 | Ardouin ............... 385/111 |
| 2003/0228116 | A1 | 12/2003 | Davis et al. ............... 385/109 |

FOREIGN PATENT DOCUMENTS

EP    1115017 A1    11/2001

OTHER PUBLICATIONS

Baccaro et al., "Characterization of alternate resins for fiber optic loose tubes," Proceedings of the 61$^{st}$ Annual Convention of the Wire Association International, Atlanta, Georgia (Nov. 1991) and Charleston, South Carolina (Apr. 1991), pp. 145-150.

* cited by examiner

*Primary Examiner*—Frank G. Font
*Assistant Examiner*—James P. Hughes
(74) *Attorney, Agent, or Firm*—King & Spalding

(57) ABSTRACT

The present invention provides a communication cable buffer tube having a flexural modulus ranging from about 180 kpsi to about 280 kpsi.

20 Claims, 3 Drawing Sheets

CONVENTIONAL CABLE STRUCTURE WITH BUFFER TUBE MATERIAL IN ACCORDANCE WITH AN EXEMPLARY EMBODIMENT OF THE PRESENT INVENTION

CONVENTIONAL CABLE STRUCTURE WITH BUFFER TUBE MATERIAL IN ACCORDANCE WITH AN EXEMPLARY EMBODIMENT OF THE PRESENT INVENTION

CONVENTIONAL CABLE STRUCTURE WITH BUFFER TUBE MATERIAL IN ACCORDANCE WITH AN EXEMPLARY EMBODIMENT OF THE PRESENT INVENTION

CONVENTIONAL CABLE STRUCTURE WITH BUFFER TUBE MATERIAL IN ACCORDANCE WITH AN EXEMPLARY EMBODIMENT OF THE PRESENT INVENTION

BUFFER TUBES WITH IMPROVED FLEXIBILITY

CROSS REFERENCE TO RELATED APPLICATIONS

This application is a divisional of and claims priority to U.S. patent application Ser. No. 10/856,639, filed May 28, 2004 and entitled "Buffer Tubes with Improved Flexibility," the entire contents of which are hereby incorporated herein by reference. This application is related to the following patent applications that each has a divisional relationship to U.S. patent application Ser. No. 10/856,639: the U.S. patent application, entitled "Buffer Tubes with Improved Flexibility," assigned U.S. patent application Ser. No. 11/640,092, and filed concurrently herewith; the U.S. patent application, entitled "Buffer Tubes with Improved Flexibility," assigned U.S. patent application Ser. No. 11/639,800, and filed concurrently herewith; the U.S. patent application, entitled "Buffer Tubes with Improved Flexibility," assigned U.S. patent application Ser. No. 11/639,956, and filed concurrently herewith; and the U.S. patent application, entitled "Buffer Tubes with Improved Flexibility," assigned U.S. patent application Ser. No. 11/639,646, and filed concurrently herewith.

FIELD OF THE INVENTION

This invention generally relates to communication cables. Particularly, the invention relates to communication cables containing optical fibers. More particularly, the invention relates to buffer tubes for fiber optic cables.

BACKGROUND

Cables containing optical fibers are used to transmit information, including voice, video and data signals, over long distances. They can be grouped into three main categories, which are distinguished by the location of the optical fibers within the cable. For example, in loose tube fiber optic cables, the optical fibers lie in one or more buffer tubes that are stranded about an elongated central strength member. Each of the buffer tubes usually includes a water-blocking material, such as a gel or other filler material that prevents moisture intrusion. In cases where the buffer tube count is less than the maximum number that can be stranded about the central strength member, the loose tube designs may include one or more flexible filler rods. The filler rods, which are typically fabricated from solid or cellular polymers, are wrapped about the central strength member and help minimize gaps between the central strength member and an outer protective covering or polymer jacket.

Other fiber optic cable designs include monotube and slotted core cables. In monotube cables, the optical fibers are contained within a single, central buffer or core tube that contains a water-blocking agent. In slotted core cables, the optical fibers reside in channels or grooves that have been formed on a surface of a rod-shaped polymer core. The grooves typically follow a helical path along the surface of the core, which reduces compressive and tensile forces on the optical fibers whenever the cable is twisted, stretched, bent or compressed. The helical path traversed by the grooves may reverse direction at regular intervals along the cable's longitudinal axis, which further reduces the forces acting on the optical fibers. In addition to a central strength member and a water-blocking agent, which is disposed in each of the grooves, slotted core cables usually include a buffer tube that covers the slotted core. Both monotube and slotted core cables also include an outer protective covering or polymer jacket.

Each of the fiber optic cable designs—loose tube, monotube, slotted core—may include other components, including reinforcing yarns and fibers, rip cords, strength members and additional water-blocking materials (hot melts, water swellable powders, etc.). The fiber optic cables may also include helically wrapped tapes, corrugated armor and similar layers that help protect the optical fibers within the cable.

The buffer tube or core provides the primary protection for the optical fiber. As a result, the buffer tubes should be robust, exhibit good resistance to compressive, tensile and twisting forces (i.e., crush resistance) while maintaining adequate flexibility over a wide range of temperatures. Other desirable properties include low cost and low moisture sensitivity, as well as good heat resistance, dimensional stability (e.g., low coefficient of thermal expansion) and chemical resistance. A useful parameter for measuring or indicating the robustness, crush resistance and flexibility of a polymer is flexural modulus.

Currently optical fiber buffer tubes are manufactured using polypropylene (PP), polyethylene (PE), copolymers of PP and PE, nucleated copolymers of polypropylene and polyethylene (n-PP), polybutylene terephthalate (PBT), polyamides such as nylon 12, polycarbonate (PC), fluoropolymers, and multiple layers of these materials, such as a dual-wall tube using polybutylene terephthalate and polycarbonate (PBT/PC).

Though useful, none of these materials is completely satisfactory. PBT and PBT/PC are robust, exhibit good crush resistance and are perhaps the most widely used materials for buffer tubes, but they have marginal flexibility, exhibiting a flexural modulus in excess of about 370 kpsi at room temperature. Because of the high flexural modulus and robustness, PBT buffer tubes have a tendency to kink when they are bent instead of uniformly bending with a smooth, gradual radius. Though PBT can be treated to make it more flexible, such treatments increase its cost, making it less attractive for buffer tube applications. Additionally, PBT is susceptible to hydrolysis, which results in a loss of strength following exposure to moisture. Polyamides also are susceptible to hydrolysis and tend to be hygroscopic, which negatively impacts their mechanical and electrical properties and their dimensional stability.

Polyolefins such as PE, PP and copolymers of PE and PP each have a flexural modulus less than about 180 kpsi and therefore exhibit good flexibility. However, these materials generally possess poor crush resistance, making them less useful for buffer tube applications. As compared to PBT, polyolefins such as PE, PP and n-PP exhibit lower tensile, flexural and compressive strength, and lower thermal resistance. Furthermore, PE, PP and many of the copolymers of PE and PP undergo post-extrusion shrinkage, which may result in an increase in excess fiber length (ratio of optical fiber length to buffer tube length) over PBT. Increases in excess fiber length may lead to increased signal attenuation.

SUMMARY

The present invention provides a communication cable buffer tube having a flexural modulus ranging from about 180 kpsi to about 280 kpsi.

BRIEF DESCRIPTION OF THE DRAWINGS

The products and processes described herein will be understood in light of FIGS. 1-3, wherein:

FIGS. 1-3 illustrate specific aspects of the products and processes described in the present specification and constitute a part of the specification. Together with the following description, the Figures demonstrate and explain the principles of the products and processes of the present invention.

DETAILED DESCRIPTION

The following description includes specific details in order to provide a thorough understanding of the novel cable and buffer tube. The skilled artisan will understand, however, that the products and methods described below can be practiced without employing these specific details. Indeed, they can be modified and can be used in conjunction with products and techniques known to those of skill in the art. For example, this specification describes buffer tubes for use in loose tube optical fiber cables, but the buffer tubes may be used for other types of cables, such as tight buffer or fiber ribbon cables. Indeed, the buffer tubes of the present invention can be used anywhere a robust, crush resistant and flexible tube is needed.

The communication cable generally includes buffer tubes that are robust, crush resistant, flexible, and cost effective. Tubes having these properties allow the cables to be handled in the field without damaging the fibers, and allow easy management of the tubes and cables when routing the tubes and cables. Buffer tubes with these properties can be obtained by using a polymer mixture of an elastic or rubbery additive polymer and a base polymer that is robust and crush resistant. A parameter useful for identifying the robustness, crush resistance and flexibility properties of a polymer or other buffer tube material is flexural modulus. The base polymer typically has a high flexural modulus relative to the flexural modulus of the additive polymer.

Buffer tubes made from PBT exhibit robustness, crush resistance and a flexural modulus of about 380 kpsi, while buffer tubes made from n-PP exhibit flexibility and a flexural modulus of about 180 kpsi. In an embodiment of the invention the polymer mixture has a flexural modulus ranging from about 180 to about 380 kpsi. In another embodiment of the invention the polymer mixture has a flexural modulus ranging from about 180 to about 280 kpsi, thus allowing for enough crush resistance while providing for better flexibility. The polymer mixture may contain a homopolymer, a copolymer, a terpolymer or a mixture thereof. The copolymer may be an alternating copolymer, a random copolymer, a block copolymer, or a graft copolymer.

Figure 1:
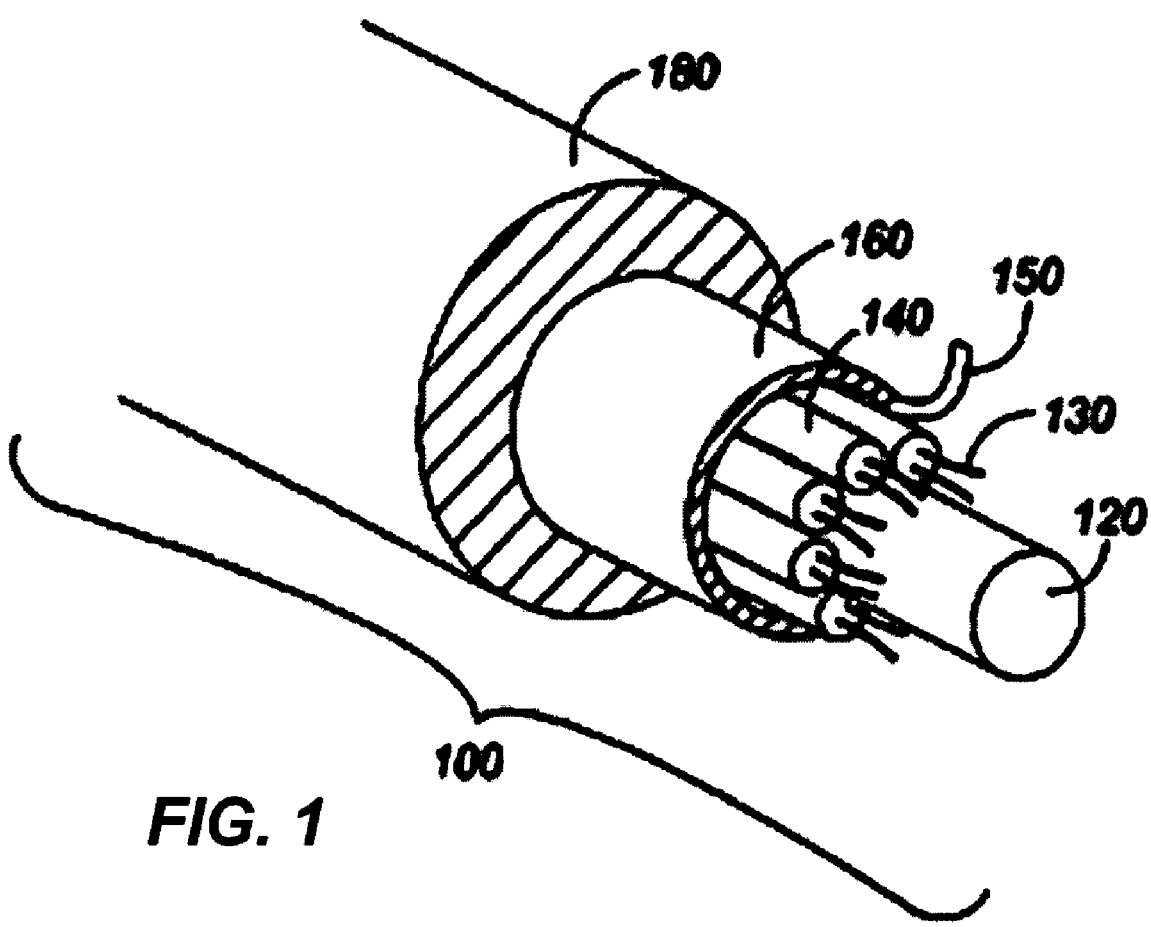
FIG. 1 shows a perspective side view of an embodiment of a loose tube fiber optic cable.

FIG. 1 illustrates a loose tube fiber optic cable (100) incorporating the buffer tubes of the invention. Typically, this structure incorporates a central strength member (120). A plurality of buffer tubes (140) are placed around the central strength member (120). Optical fibers (130) are contained within the buffer tubes (140). When desired, the buffer tubes (140) can be filled with a gel or other water-blocking agent as known in the art. Radial strength yarns (160) can be wrapped around the central strength member (120) and the buffer tubes (140). A ripcord (150) can be placed within the cable (100) so that the radial strength yarns (160) and outer layers can be at least partially removed to access the inner parts of the cable (100). Optionally, armor such as a metallic shield (not shown) can be placed around the central strength member (120), buffer tubes (140), and the yarns (160) to further protect the cable (100). Lastly, an outer jacket (180) is placed around the internal components of the cable (100).

Figure 2:
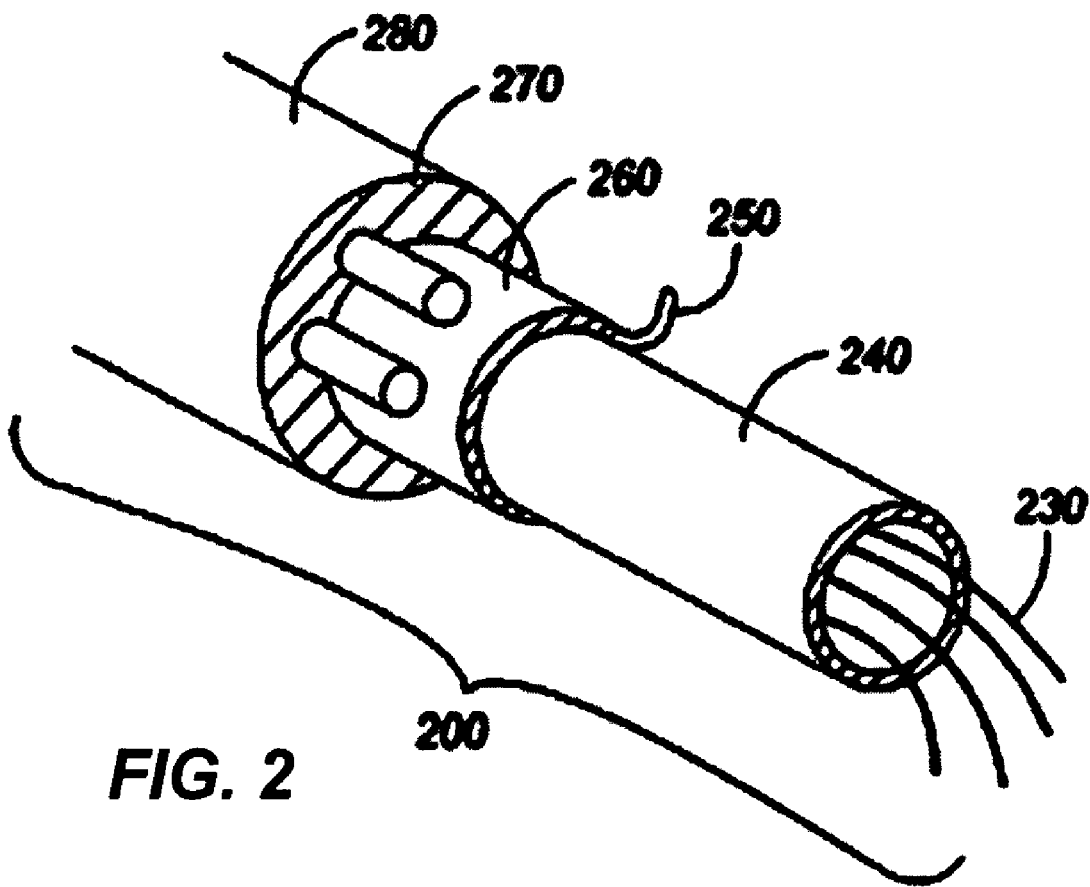
FIG. 2 shows a perspective side view of an embodiment of a monotube fiber optic cable.

FIG. 2 illustrates a monotube fiber optic cable (200) incorporating the buffer tubes of the invention. The central core tube (240) contains optical fibers (230). As well, the buffer tube (240) may contain a gel or other water-blocking agent as known in the art. Radial strength yarns (260) are wrapped around the central core tube (240). A ripcord (250) can be placed within the cable (200) so that the radial strength yarns (260) and outer layers can be at least partially removed to access the inner parts of the cable (200). Strength members (270) are placed around the yarns (260) and central core tube (240). The strength members (270) may be placed into different positions within the cable structure. Additionally, armor (not shown) can be placed around the central core tube (240) and the yarn (260) to further protect the cable. Lastly, an outer jacket (280) is placed around the internal components of the cable (200).

Figure 3:
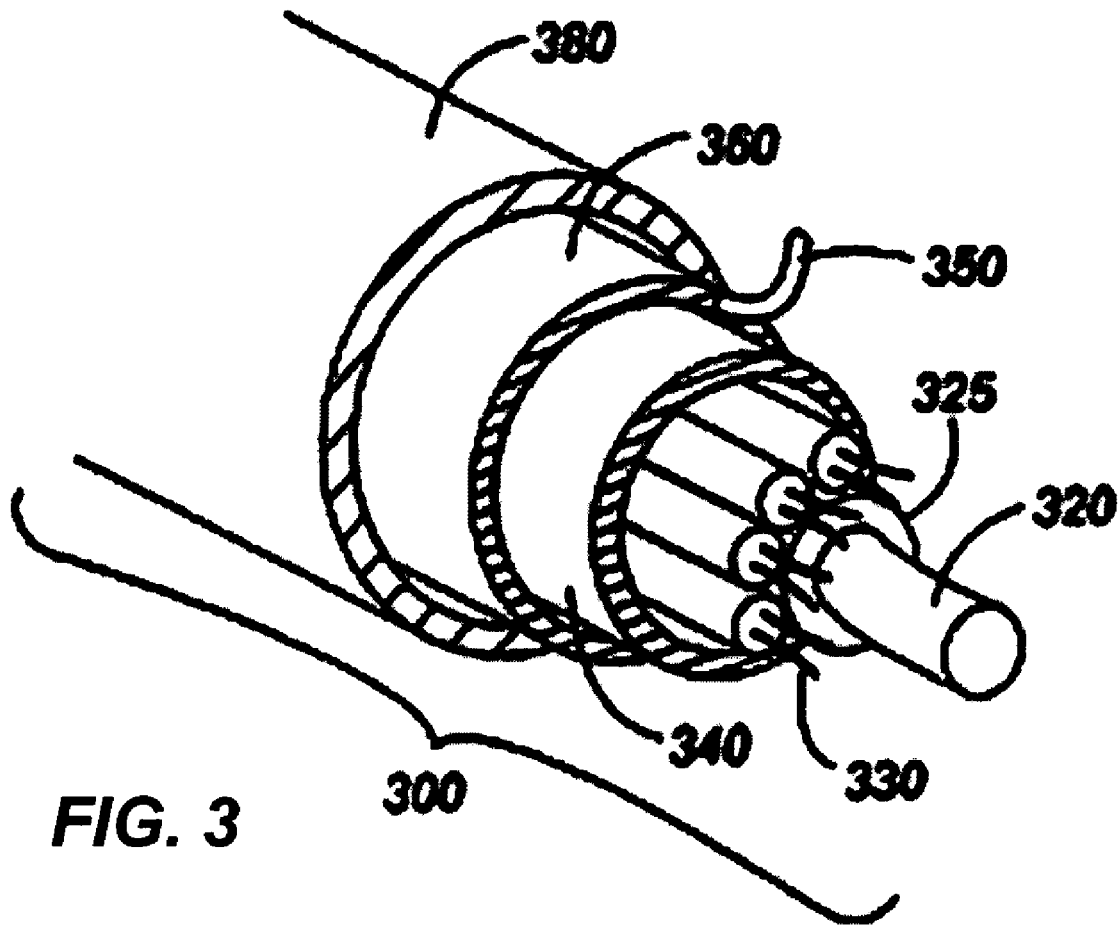
FIG. 3 shows a perspective side view of an embodiment of a slotted core tube fiber optic cable.

FIG. 3 illustrates a slotted tube optical fiber cable (300) containing the buffer tubes of the invention. In cable (300), a slotted core (325) surrounds a central strength member (320). The slotted core (325) contains optical fibers (330) and the slotted core (325), in turn, is contained within a buffer tube (340). The buffer tube (340) may also contain a gel or other water-blocking agent as known in the art. A radial strength yarn (360) is wrapped around the buffer tube (340), slotted core (325), and the central strength member (320). A ripcord (350) can be placed in a position such that the radial strength yarns (360) and other outer layers can be partially or fully removed to access the inner portion of the cable (300). Additionally, armor (not shown) can be placed around the central strength member (320), buffer tube (340), and the yarn (360) to further protect the cable. Lastly, an outer jacket (380) is placed around the internal components of the cable (300).

The buffer tubes used in the cables are usually made of a polymer mixture. The polymer mixture generally contains a base polymer that is blended with an additive polymer. The base polymer provides robustness and crush resistance, and includes, but is not limited to, polypropylene (PP), polyethylene (PE), copolymers of PP and PE, nucleated copolymers of polypropylene and polyethylene (n-PP), polybutylene terephthalate (PBT), polyamides, polyethylene terephthalate (PET), polycarbonate (PC), fluoropolymers, polyester elastomers, acetal resins, and a mixture or combination of two or more polymers, such as PBT and polycarbonate (PBT/PC) or PBT and PET (PBT/PET).

A polymer mixture having enough crush resistance while providing for better flexibility can be achieved by reducing the flexural modulus of the base polymer. This can be done by adding or blending a low flexural modulus additive polymer to the high flexural modulus base polymer, such that the polymer mixture exhibits flexibility and robustness between the properties of PP and PBT. In an embodiment the polymer mixture exhibiting the desired robustness, crush resistance and flexibility is achieved by using PBT, PET, PC, or a combination thereof as the base polymer and reducing its flexural modulus by adding or blending a suitable additive polymer into the base polymer.

Additive polymers have a low flexural modulus and are compatible with the base polymer. Additive polymers that have a low flexural modulus and that are suitable for use with PBT, PET, PC and other mixtures or combinations thereof include, but are not limited to, low flexural modulus polyesters, ester-acid terpolymers and ethylene-ester copolymers. The suitable polyesters include polyurethane, polyvinyl acetate, modified polyesters, co-polyester-ether, and other co-polyesters. Suitable ester-acid terpolymers include ethylene ester acrylic acid terpolymers, such as ethylene methyl acrylate acrylic acid (EMAAA). Suitable ethylene-ester copolymers generally include ethylene and an acrylate co-monomer. The presence of an acrylate co-monomer makes the ethylene-ester compatible with PBT. The ethylene-ester copolymers exhibit excellent compatibility with PBT, chemical and heat resistance, low flexural modulus, and moderate cost. The ethylene-ester copolymers include, but are not limited to, ethylene methyl acrylate (EMA), ethylene butyl acrylate (EBA), and ethylene vinyl acetate (EVA). The flexural modulus of EMA and EBA typically ranges from about 3 to about 6 kpsi. The amount of acrylate co-monomer can be varied from about 20 to about 30 volume percent of the ethylene-ester copolymer in order to achieve the desired compatibility with PBT. In an embodiment the buffer tubes are made from a mixture of PBT and EBA or EMA.

The mixture can be made by any procedure known to those of skill in the art. In an embodiment the additive polymer and base polymer are blended together dry, then melt mixed in an extruder. The amounts of the base polymer and additive polymer in the polymer mixture depend on the desired characteristics of the buffer tubes, as well as cost considerations. In an embodiment of the invention, about 5 to about 50 volume percent additive polymer is mixed with about 50 to about 95 volume percent base polymer. Mixing the polymers in these amounts produces a buffer tube with adequate cold temperature performance, yet with a flexural modulus in the desired range as detailed above. In addition, mixing the polymers in these amounts minimizes costs: buffer tubes made using these amounts cost about half as much as PBT buffer tubes. In another embodiment, about 5 to about 25 volume percent additive polymer is mixed with about 75 to about 95 volume percent base polymer.

What is claimed is:

1. A method for communicating, comprising:
   providing a cable with a buffer tube comprising a polymer mixture of:
      PBT, PET, PC, or a combination thereof; and
      EMA, EBA, EVA, EMAAA, or a combination thereof; and
   transmitting a signal over the cables,
   wherein the buffer tube comprises an agent for promoting compatibility between the PBT, PET, PC, or combination thereof and the EMA, EMA, EVA, EMAAA, or combination thereof.

2. The method of claim 1, wherein the cable comprises an optical conductor for transmitting the signal.

3. The method of claim 1, wherein the agent comprises a co-monomer.

4. The method of claim 1, wherein the agent comprises an acrylate.

5. The method of claim 1, wherein the agent comprises an acrylate co-monomer.

6. The method of claim 1, wherein the polymer mixture comprises PBT and EMA.

7. The method of claim 1, wherein the polymer mixture comprises:
   a combination of at least two of PBT, PET, and PC; and
   a combination of at least two of EMA, EBA, EVA, and EMAAA.

8. The method of claim 1, wherein the polymer mixture comprises a combination of PBT, PET, and PC and a combination of EMA, EBA, EVA, and EMAAA.

9. A method for communicating, comprising:
   providing a cable with a buffer tube comprising a polymer mixture of:
      PBT, PET, PC, or a combination thereof; and
      EMA, EBA, EVA, EMAAA, or a combination thereof; and
   transmitting a signal over the cable,
   wherein the polymer mixture comprises PBT and EMAAA.

10. A method of communication comprising the steps of:
    providing a fiber optic cable, comprising an optical fiber disposed in a buffer tube; and
    transmitting a signal over the fiber optic cable,
    wherein the buffer tube comprises:
       a first polymer, having a flexural modulus of about 370 kpsi or higher that provides crush resistances, blended with a second polymer, having a flexural modulus of about 180 kpsi or lower that provides flexibility; and
       a material that promotes compatibility between the first polymer and the second polymer.

11. The method of claim 10, wherein the first polymer comprises polybutylene terephthalate.

12. The method of claim 11, wherein the second polymer comprises ethylene-ester.

13. The method of claim 11, wherein the second polymer comprises a co-polymer.

14. The method of claim 11, wherein the second polymer comprises ethylene-ester co-polymer.

15. The method of claim 14, wherein the material comprises acrylate.

16. The method of claim 14, wherein the material comprises co-polymer.

17. The method of claim 14, wherein the material comprises acrylate co-monomer.

18. A method for communicating, comprising the steps of:
    providing a cable, comprising an optical fiber disposed in a buffer tube and a jacket circumferentially covering the buffer tube; and
    transmitting a signal over the optical fiber,
    wherein the buffer tube comprises:
       a base polymer operative to enhance crush resistance of the buffer tube as compared to another tube exclusively composed of an additive polymer; and
       the additive polymer blended with the base polymer to enhance flexibility of the buffer tube as compared to another tube exclusively composed of the base polymer.

19. The method of claim 18, wherein the buffer tube comprises an agent that promotes chemical compatibility between the base polymer and the additive polymer.

20. A method of communication comprising the steps of:
    providing a fiber optic cable, comprising an optical fiber disposed in a buffer tube; and
    transmitting a signal over the fiber optic cable,
    wherein the buffer tube comprises a first polymer that provides crush resistance blended with a second polymer that provides flexibility and a material that promotes compatibility between the first polymer and the second polymer,
wherein the provided crush resistance is higher than a crush resistance level of another buffer tube consisting of the second polymer, and
wherein the provided flexibility is higher than a flexibility level of another buffer tube consisting of the first polymer.

* * * * *

UNITED STATES PATENT AND TRADEMARK OFFICE
CERTIFICATE OF CORRECTION

PATENT NO. : 7,346,257 B2 Page 1 of 1
APPLICATION NO. : 11/639645
DATED : March 18, 2008
INVENTOR(S) : Jeffrey H. Mumm et al.

It is certified that error appears in the above-identified patent and that said Letters Patent is hereby corrected as shown below:

Column 5, Claim 1, line 52, "cables" should read --cable--.

Column 5, Claim 1, line 55, "EMA, EMA" should read --EMA, EBA--.

Column 6, Claim 10, line 25, "resistances," should read --resistance,--.

Signed and Sealed this

Seventeenth Day of June, 2008

JON W. DUDAS
*Director of the United States Patent and Trademark Office*